United States Patent
Okazaki et al.

(10) Patent No.: US 10,803,388 B2
(45) Date of Patent: Oct. 13, 2020

(54) NETWORK TRAINING DEVICE, NETWORK TRAINING SYSTEM, NETWORK TRAINING METHOD, AND COMPUTER PROGRAM PRODUCT

(71) Applicant: Canon Medical Systems Corporation, Otawara-shi, Tochigi (JP)

(72) Inventors: Tomoya Okazaki, Kanagawa (JP); Marco Visentini Scarzanella, Tokyo (JP); Toshimitsu Kaneko, Kanagawa (JP); Yasunori Taguchi, Kanagawa (JP); Wataru Watanabe, Kanagawa (JP)

(73) Assignee: Canon Medical Systems Corporation, Otawara-shi, Tochigi (JP)

( * ) Notice: Subject to any disclaimer, the term of this patent is extended or adjusted under 35 U.S.C. 154(b) by 611 days.

(21) Appl. No.: 15/688,316

(22) Filed: Aug. 28, 2017

(65) Prior Publication Data

US 2018/0268297 A1 Sep. 20, 2018

(30) Foreign Application Priority Data

Mar. 17, 2017 (JP) ................................. 2017-053330

(51) Int. Cl.
*G06N 3/08* (2006.01)
*G06N 3/04* (2006.01)
(Continued)

(52) U.S. Cl.
CPC ........... *G06N 3/084* (2013.01); *G06N 3/0454* (2013.01); *G06N 3/088* (2013.01);
(Continued)

(58) Field of Classification Search
CPC ...................................................... G06N 3/084
See application file for complete search history.

(56) References Cited

U.S. PATENT DOCUMENTS

2018/0350110 A1* 12/2018 Cho ........................ G06T 9/004

FOREIGN PATENT DOCUMENTS

| JP | H6-147895 A | 5/1994 |
| JP | H6-266691 A | 9/1994 |
| (Continued) | | |

OTHER PUBLICATIONS

Cavallari et al., "Unsupervised representation learning using convolutional and stacked auto-encoders: a domain and cross-domain feature space analysis", 2018, arXiv, all pages (Year: 2018).*

(Continued)

*Primary Examiner* — Daniel C Puentes
(74) *Attorney, Agent, or Firm* — Finnegan, Henderson, Farabow, Garrett & Dunner, L.L.P.

(57) ABSTRACT

According to an embodiment, a network training device includes a first training unit that trains a first network that converts an input signal to a first signal, a second training unit that trains a second network that converts the first signal to a second signal, and a third training unit that trains a third network that converts the second signal to an output signal. The first training unit trains the first network as an encoder of a first autoencoder. The second training unit trains the second network by backpropagation by using a second signal for training corresponding to the first signal for training as supervised data. The second signal for training is generated by an encoder of a second autoencoder that encodes a third signal for training into the second signal for training, and decodes the second signal for training into the third signal for training.

9 Claims, 8 Drawing Sheets

(51) Int. Cl.
 *G06K 9/00* (2006.01)
 *G06T 7/00* (2017.01)
(52) U.S. Cl.
 CPC ........ *G06K 9/00248* (2013.01); *G06T 7/0002* (2013.01); *G06T 2207/20084* (2013.01)

(56) References Cited

FOREIGN PATENT DOCUMENTS

| | | |
|---|---|---|
| JP | 2015-167041 A | 9/2015 |
| JP | 2016-212688 A | 12/2016 |
| WO | WO 2016/132468 A1 | 8/2016 |

OTHER PUBLICATIONS

Girdhar, Rohit, et al. "Learning a Predictable and Generative Vector Representation for Objects ." European Conference on Computer Vision. Springer International Publishing, (2016) pp. 1-16.
Hinton, Geoffrey E., and Ruslan R. Salakhutdinov "Reducing the dimensionality of data with neural networks." Science 313.5786 (2006) pp. 504-507.

\* cited by examiner

NETWORK TRAINING DEVICE, NETWORK TRAINING SYSTEM, NETWORK TRAINING METHOD, AND COMPUTER PROGRAM PRODUCT

CROSS-REFERENCE TO RELATED APPLICATIONS

This application is based upon and claims the benefit of priority from Japanese Patent Application No. 2017-053330, filed on Mar. 17, 2017; the entire contents of which are incorporated herein by reference.

FIELD

Embodiments described herein relate generally to a network training device, a network training system, a network training method, and a computer program product.

BACKGROUND

There is a known technique of analyzing an image using a neural network. For example, developed is a deep neural network that receives an image as an input and outputs a desired signal related to a subject such as structure information of the subject reflected in the image. For training such a network, a large amount of supervised data is typically required. That is, it is difficult to stably train such a network without an environment in which a large amount of supervised data can be obtained. Thus, a novel technique is demanded for stably training the network without using a large amount of supervised data. Network training means processing of optimizing a network parameter (a weight or a bias of each node constituting the network).

DETAILED DESCRIPTION

Figure 1:
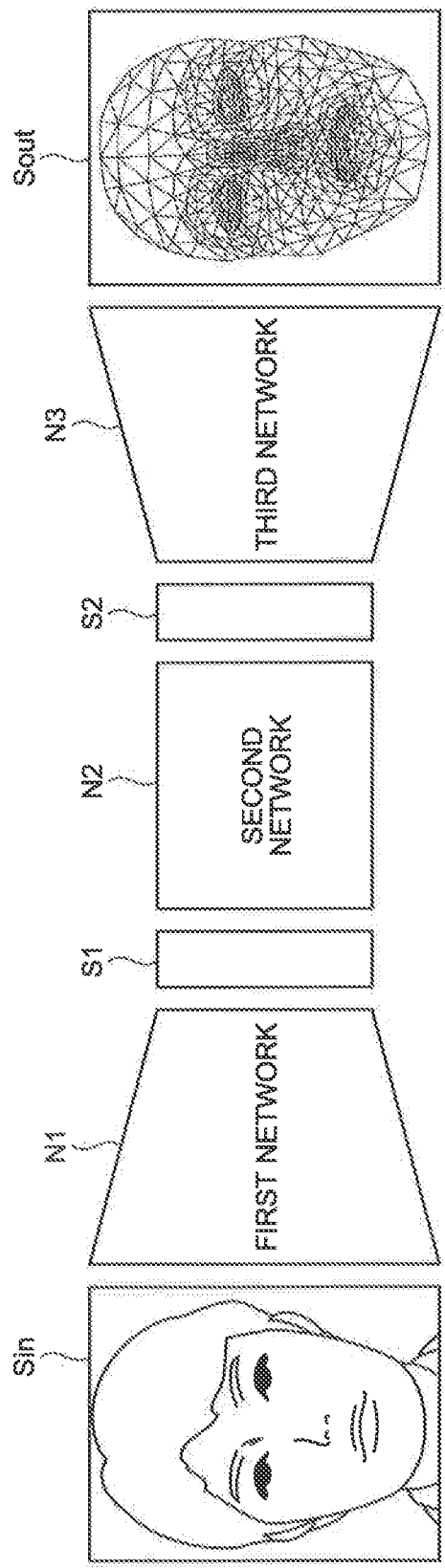
FIG. 1 is a diagram illustrating an outline of a neural network.

According to an embodiment, a network training device is adapted to train a neural network. The neural network includes a first network, a second network and a third network. The first network converts an input signal to a first signal. The second network converts the first signal to a second signal. The third network converts the second signal to an output signal. The device includes a first training unit, a second training unit, a third training unit. The first training unit is configured to train the first network. The second training unit is configured to train the second network. The third training unit is configured to train the third network. The first training unit trains the first network as an encoder of a first autoencoder that encodes an input signal for training into a first signal for training having lower dimensionality than the input signal for training and decodes the first signal for training into the input signal for training. The second training unit trains the second network by backpropagation by using a second signal for training corresponding to the first signal for training as supervised data. The second signal for training is generated by an encoder of a second autoencoder that encodes a third signal for training into the second signal for training having lower dimensionality than the third signal for training and decodes the second signal for training into the third signal for training.

The following describes a network training device, a network training system, a network training method, and a computer program product in detail with reference to the attached drawings. In the following description, components having the same function are denoted by the same reference numeral, and redundant description will not be repeated.

First Embodiment

FIG. 1 is a diagram illustrating an outline of a neural network assumed as a training target in the present embodiment. The neural network assumed in the present embodiment includes, as illustrated in FIG. 1, a first network N1, a second network N2, and a third network N3.

The first network N1 is a network that converts an input signal Sin to a first signal S1. The input signal Sin is, for example, a two-dimensional image obtained by photographing a human face as a subject. The first network N1 outputs the first signal S1 when the input signal Sin is input. The first network N1 is preferably constituted of two or more layers of neural network, and includes a convolutional neural network (CNN). The convolutional neural network is known to be able to efficiently extract a local characteristic of an image, and mainly applied to a field of image processing.

The second network N2 is a network that converts the first signal S1 to a second signal S2. The first signal S1 and the second signal S2 are signals having lower dimensionality than the input signal Sin. The second network N2 outputs the second signal S2 when the first signal S1 as an output of the first network N1 is input. The second network N2 is constituted of one or more layers of neural network.

The third network N3 is a network that converts the second signal S2 to an output signal Sout. The output signal Sout is, for example, a set of three-dimensional point sequences expressing a human face reflected in the two-dimensional image input as the input signal Sin to the first network N1. The third network N3 outputs the output signal Sout when the second signal S2 as an output of the second network N2 is input. The third network N3 is constituted of two or more layers of neural network. When an image signal is output as the output signal Sout instead of the set of three-dimensional point sequences described above, the third network N3 preferably includes the convolutional neural network similarly to the first network N1.

The neural network illustrated in FIG. 1 is, for example, a deep neural network for obtaining the set of three-dimensional point sequences of the face from the two-dimensional image obtained by photographing the human face, and is used for estimating structure information from the human face. The network training device according to the present embodiment is used for training such a neural network. The neural network illustrated in FIG. 1 may have a configuration in which the input signal Sin is a two-dimensional image obtained by photographing a subject other than the human face. Also in this case, the network training device according to the present embodiment can stably train the neural network using a method described below. The neural network illustrated in FIG. 1 may have a configuration in which the input signal Sin is a two-dimensional moving image or a three-dimensional image such as volume data scanned by an X-ray CT scanner. Also in the case, the network training device according to the present embodiment can stably train the neural network using a method described below. The neural network illustrated in FIG. 1 may have a configuration for outputting, as the output signal Sout, not only the set of three-dimensional point sequences but also a two-dimensional outline or a characteristic point position, position and posture information about an object, depth information, and one like. Also in the case, the network training device according to the present embodiment can stably train the neural network using a method described below.

Figure 2:
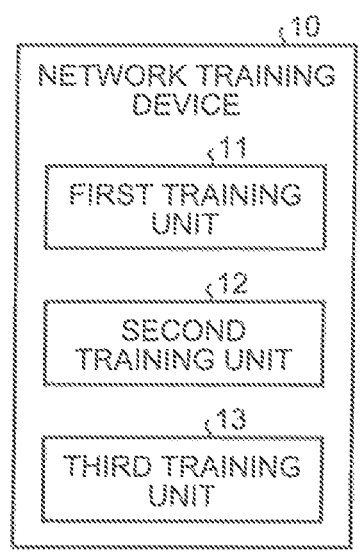
FIG. 2 is a block diagram illustrating a functional configuration example of a network training device according to a first embodiment.

FIG. 2 is a block diagram illustrating a functional configuration example of a network training device 10 according to the present embodiment. The network training device 10 according to the present embodiment includes a first training unit 11, a second training unit 12, and a third training unit 13 as illustrated in FIG. 2.

The first training unit 11 trains the first network N1 in the neural network illustrated in FIG. 1. The first training unit 11 trains the first network N1 using an autoencoder. The autoencoder is a mechanism that trains the neural network such that dimensionality of data can be efficiently compressed by optimizing a network parameter so that an output can reconstruct an input as much as possible. The autoencoder performs training without supervised data, so that the training can be performed only with an input. Thus, a large amount of supervised data is not required, and the training can be easily performed.

Figure 3:
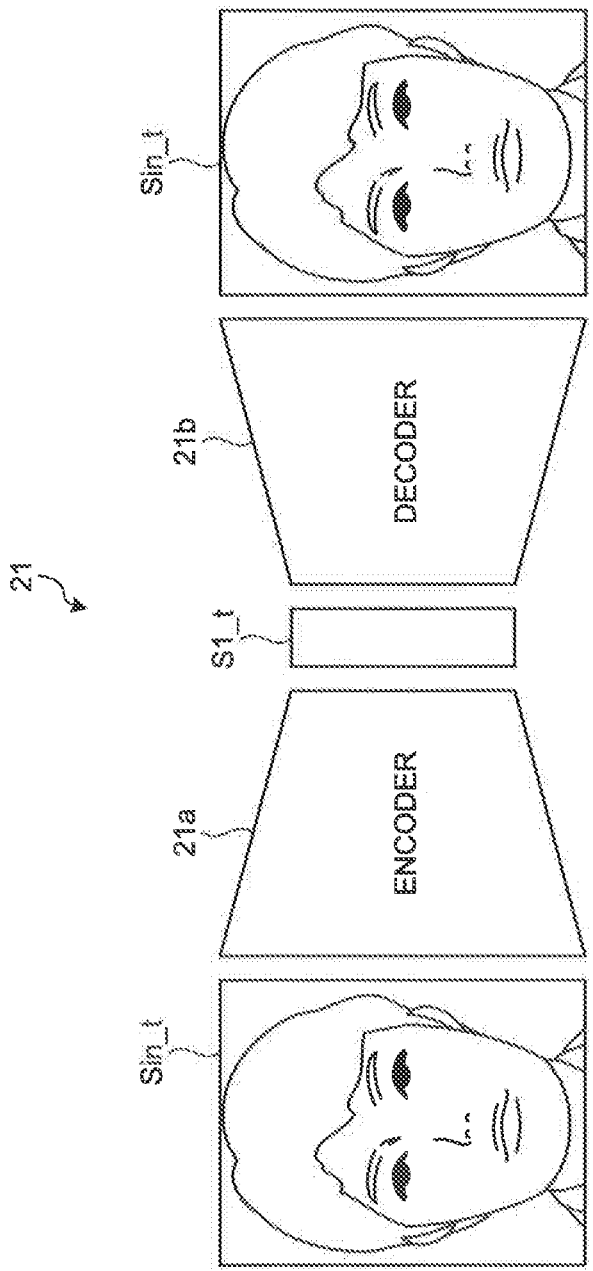
FIG. 3 is a schematic diagram for explaining a first autoencoder.

FIG. 3 is a schematic diagram for explaining an autoencoder (hereinafter, referred to as a "first autoencoder") 21 used for training the first network N1. As illustrated in FIG. 3, the first autoencoder 21 is a network that encodes an input signal for training Sin_t into a first signal for training S1_t having lower dimensionality than the input signal for training Sin_t, and decodes the first signal for training S1_t into the input signal for training Sin_t. The first autoencoder 21 includes an encoder 21a that converts the input signal for training Sin_t into the first signal for training S1_t, and a decoder 21b that converts the first signal for training S1_t into the input signal for training Sin_t. The input signal for training Sin_t is a signal of the same type as the input signal Sin input to the first network N1 in the neural network illustrated in FIG. 1, and used as an input of the first autoencoder 21.

The first training unit 11 trains the first network N1 in the neural network illustrated in FIG. 1 as the encoder 21a of the first autoencoder 21 illustrated in FIG. 3. For example, the entire first network N1 is regarded as one encoder 21a, and the first autoencoder 21 trains the entire first network N1. The first network N1 after training can be interpreted as an encoder that converts the input signal Sin to the first signal S1. The training may be performed by configuring the autoencoder for each layer of the first network N1 using a method disclosed in the following cited reference.

CITED REFERENCE

Hinton, Geoffrey E., and Ruslan R. Salakhutdinov. "Reducing the dimensionality of data with neural networks." Science 313.5786 (2006): 504-507.

The third training unit 13 trains the third network N3 in the neural network illustrated in FIG. 1. The third training unit 13 trains the third network N3 using the autoencoder similarly to the first training unit 11.

Figure 4:
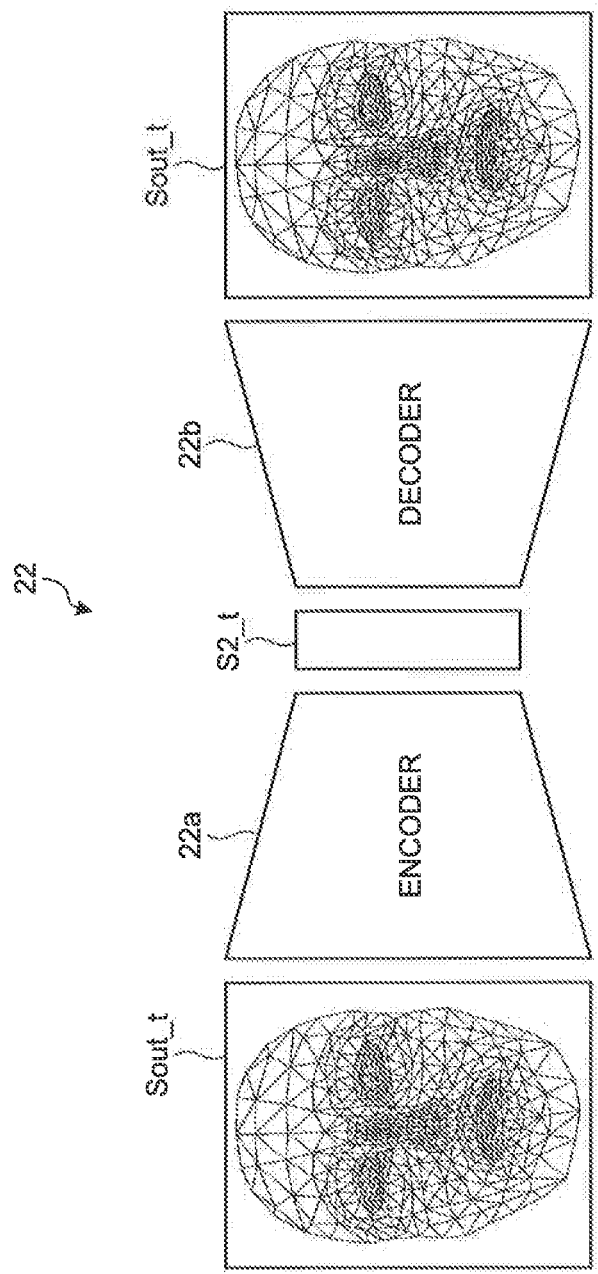
FIG. 4 is a schematic diagram for explaining a second autoencoder.

FIG. 4 is a schematic diagram for explaining an autoencoder (hereinafter, referred to as a "second autoencoder") 22 used for training the third network N3. As illustrated in FIG. 4, the second autoencoder 22 is a network that encodes an output signal for training Sout_t into a second signal for training S2_t having lower dimensionality than the input signal for training Sout_t, and decodes the second signal for training S2_t into the output signal for training Sout_t. The second autoencoder 22 includes an encoder 22a that converts the output signal for training Sout_t to the second signal for training S2_t, and a decoder 22b that converts the second signal for training S2_t to the output signal for training Sout_t. The output signal for training Sout_t is a signal of the same type as the output signal Sout output from the third network N3 in the neural network illustrated in FIG. 1, and used as an input of the second autoencoder 22. The output signal for training Sout_t used for training the third network N3 is not necessarily paired with the input signal for training Sin_t used for training the first network N1. For example, when the set of three-dimensional point sequences is used as the output signal for training Sout_t, the set of three-dimensional point sequences may be data generated by simulation using 3DCAD, a numerical model, and the like.

The third training unit 13 trains the third network N3 in the neural network illustrated in FIG. 1 as the decoder 22b of the second autoencoder 22 illustrated in FIG. 4. For example, the entire third network N3 is regarded as one decoder 22b, and the second autoencoder 22 trains the entire third network N3. The third network N3 after training can be interpreted as a decoder that converts the second signal S2 to the output signal Sout. The training may be performed by configuring the autoencoder for each layer of the third network N3 using a method disclosed in the above cited reference.

The second training unit 12 trains the second network N2 in the neural network illustrated in FIG. 1. The second training unit 12 trains the second network N2 by backpropagation (error backpropagation) by using the second signal for training S2_t corresponding to the first signal for training S1_t as supervised data.

The first signal for training S1_t used for training the second network N2 is an output of the encoder 21a when the input signal for training Sin_t is input to the first autoencoder 21 corresponding to the first network N1 after training, that is, the first autoencoder 21 in which the network parameter is optimized. The second signal for training S2_t as the supervised data used for training the second network N2 is an output of the encoder 22a when the output signal for training Sout_t paired with the first signal for training Sin_t input to the first network N1 after training is input to the second autoencoder 22 corresponding to the third network N3 after training, that is, the second autoencoder 22 in which the network parameter is optimized. That is, the second signal for training S2_t as the supervised data used for training the second network N2 is generated by the encoder 22a of the second autoencoder 22.

The second training unit 12 optimizes the network parameter of the second network N2 by backpropagation so that the output obtained when the first signal for training S1_t is input to the second network N2 becomes closer to the second signal for training S2_t. The second network N2 after training can be interpreted as a transcoder that converts the first signal S1 to the second signal S2.

Figure 5:
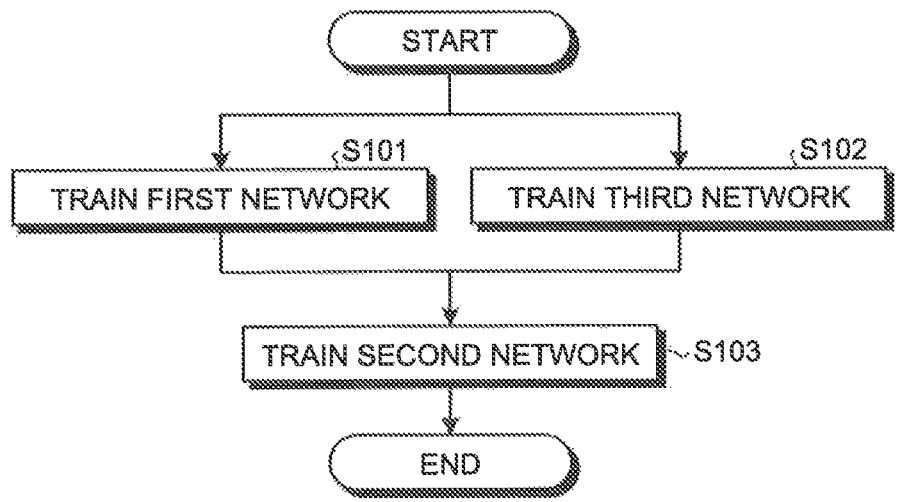
FIG. 5 is a flowchart illustrating a processing procedure of the network training device according to the first embodiment.

FIG. 5 is a flowchart illustrating a processing procedure of the network training device 10 according to the present embodiment. As illustrated in FIG. 5, in the network training device 10 according to the present embodiment, first, the first training unit 11 trains the first network N1 (Step S101), and the third training unit 13 trains the third network N3 (Step S102). The training of the first network N1 and the training of the third network N3 are independently performed using the first autoencoder 21 and the second autoencoder 22, respectively, and there is no order dependency. In the network training device 10 according to the present embodiment, after the training of the first network N1 and the training of the third network N3 are ended, the second training unit 12 trains the second network N2 (Step S103).

As described above, the network training device 10 according to the present embodiment has a configuration of training the first network N1 and the third network N3 independently by training without supervised data by using the autoencoder, and training only the second network N2 that converts the first signal S1 having lowered dimensionality to the second signal S2 by backpropagation. Accordingly, the network training device 10 according to the present embodiment can stably train the network without using a large amount of supervised data.

Typically, to output structure information from an image via a deep neural network, prepared is a pair of an input image and supervised data of the structure information to be output from the image. The deep neural network is trained End-to-End using a set group of the image and the structure information as training data. Thus, in a case of training the deep neural network by setting a new object, the training of the deep neural network is not stabilized until a sufficient number of input images are obtained, and it takes time to instruct a large number of input images of the supervised data.

In contrast, in the network training device 10 according to the present embodiment, the supervised data is not required for training the first network N1 and the third network N3. Both of the first signal S1 and the second signal S2 are signals that are converted to have lower dimensionality than an original signal by the autoencoder. Thus, the second network N2 that converts the first signal S1 to the second signal S2 can be implemented with a relatively shallow neural network. Due to this, the number of pieces of supervised data required for stably training the second network N2 can be significantly reduced as compared with a case of training the entire network illustrated in FIG. 1 End-to-End from the first. As a result, the deep neural network can be stably trained even when the number of pieces of supervised data is small.

In "Girdhar, Rohit, et al. 'Learning a Predictable and Generative Vector Representation for Objects.' European Conference on Computer Vision. Springer International Publishing, 2016.", disclosed is a method of using a network pretrained with an ImageNet database as a first network and training a second network with an autoencoder that converts a teaching signal to have low dimensionality as a training method for a neural network including the first network that converts an input signal to a first signal having low dimensionality and the second network that converts the first signal to an output signal. However, in this method, when the pretrained network cannot be used, for example, to optionally change a network structure or to handle a three-dimensional image, the first network needs to be trained again by using a large amount of supervised data. The teaching signal in a case of training the first network as a single network is an output of the encoder of the second network trained by the autoencoder. Thus, the first network cannot be trained unless the training of the second network by the autoencoder is ended, so that training time is prolonged.

In contrast, in the network training device 10 according to the present embodiment, both of the first network N1 and the third network N3 are trained independently by the autoencoder, so that a problem in the method disclosed in "Girdhar, Rohit, et al. 'Learning a Predictable and Generative Vector Representation for Objects.' European Conference on Computer Vision. Springer International Publishing, 2016." is resolved, and the network can be stably trained without using a large amount of supervised data.

First Modification

After the training of the second network N2 is ended, the network training device 10 according to the present embodiment may connect the first network N1 and the third network N3 that have been already trained to the second network N2, and may fine-tune the entire neural network.

Figure 6:
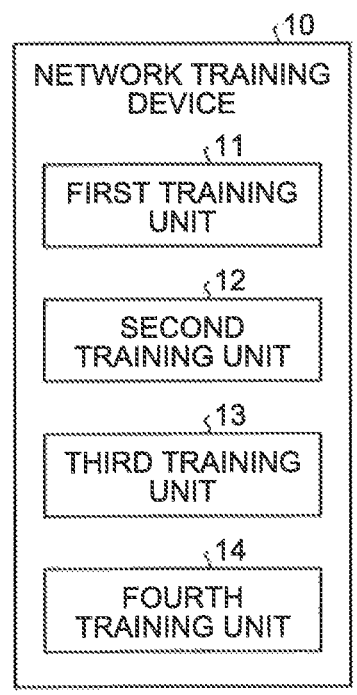
FIG. 6 is a block diagram illustrating a functional configuration example of a network training device according to a first modification.

FIG. 6 is a block diagram illustrating a functional configuration example of the network training device 10 according to the present modification. A difference from the configuration illustrated in FIG. 2 is that a fourth training unit 14 is added. The fourth training unit 14 fine-tunes, by backpropagation, the entire neural network in which the first network N1 trained by the first training unit 11, the second network N2 trained by the second training unit 12, and the third network N3 trained by the third training unit 13 are connected with each other.

Figure 7:
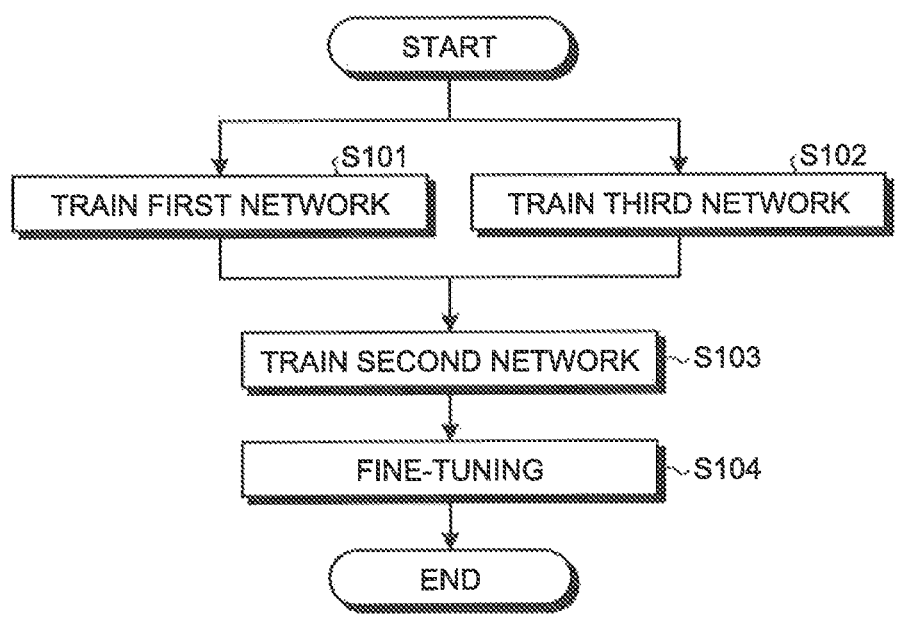
FIG. 7 is a flowchart illustrating a processing procedure of the network training device according to the first modification.

FIG. 7 is a flowchart illustrating a processing procedure of the network training device 10 according to the present modification. A difference from the processing procedure illustrated in FIG. 5 is that processing at Step S104 is added after the processing at Step S103. In the network training device 10 according to the present modification, after the training of the second network N2 by the second training unit 12 is ended at Step S103, the first network N1 that has been trained at Step S101, the second network N2 that has been trained at Step S103, and the third network N3 that has been trained at Step S102 are connected to each other. At Step S104, the fourth training unit 14 fine-tunes the entire neural network.

As described above, in the present modification, the first network N1, the second network N2, and the third network N3 are individually trained, and the entire neural network in which the first network N1, the second network N2, and the third network N3 are connected to each other is fine-tuned. Accordingly, the network parameter of the neural network can be further optimized, and accuracy of the neural network can be improved.

In the present modification, fine-tuned is the neural network including the second network N2 that has been trained by the second training unit 12. Alternatively, a configuration of fine-tuning the neural network including the second network N2 in which an optional initial value is set as the network parameter may be employed. That is, the network parameter of the second network N2 may be optimized when the fourth training unit 14 fine-tunes the entire neural network.

Second Modification

In the present embodiment, as a training target, assumed is the neural network including the third network N3 that outputs the set of three-dimensional point sequences as the output signal Sout. Alternatively, the third network N3 may be a network that outputs the output signal Sout having low dimensionality similarly to the second signal S2. For example, the third network N3 may be a simple fully-connected neural network that converts the second signal S2 output from the second network N2 to the output signal Sout having low dimensionality such as a position vector indicating a position of a face part (an eye or a nose) and a direction vector indicating a direction of a face.

In this case, the third training unit 13 trains the third network N3 not as the decoder 22b of the second autoencoder 22 illustrated in FIG. 4, but as the neural network that uses, as the supervised data, for example, the position vector or the direction vector calculated from the set of three-dimensional point sequences (the output signal for training Sout_t described above) used for the input of the second autoencoder 22 to cause the second signal for training S2_t generated by the encoder 22a of the second autoencoder 22 to be closer to the supervised data by backpropagation.

Also in the present modification, the second training unit 12 may use, as the supervised data, the second signal for training S2_t generated by the encoder 22a of the second autoencoder 22 to train the second network N2 by backpropagation.

Second Embodiment

Next, the following describes a second embodiment. The network training device 10 according to the present embodiment further has a function of changing a structural parameter of the neural network in accordance with a user operation, and a function of displaying reproducibility of the first autoencoder 21 and the second autoencoder 22 in addition to the functions in the first embodiment described above.

Figure 8:
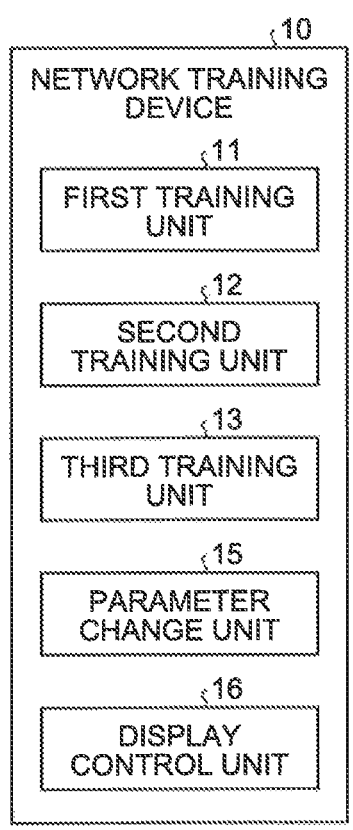
FIG. 8 is a block diagram illustrating a functional configuration example of a network training device according to a second embodiment.

FIG. 8 is a block diagram illustrating a functional configuration example of the network training device 10 according to the present embodiment. As illustrated in FIG. 8, the network training device 10 according to the present embodiment, further includes a parameter change unit 15 and a display control unit 16 in addition to the configuration illustrated in FIG. 2.

The parameter change unit 15 changes the structural parameter of the neural network illustrated in FIG. 1 in accordance with the user operation. Examples of the structural parameter of the neural network include a depth of a layer of each of the first network N1, the second network N2, and the third network N3, the number of nodes in each layer, and the number of channels or a filter size in a case in which at least one of the first network N1 and the third network N3 includes the convolutional neural network. When a user performs operation of adjusting any of the parameters using an input device, the parameter change unit 15 changes a target parameter in accordance with the user operation.

When the parameter change unit 15 changes the parameter described above in accordance with the user operation, the structure of the neural network illustrated in FIG. 1 can be adjusted. For example, by changing the number of nodes in an output layer of the first network N1 and the number of nodes in an input layer of the second network N2, dimensionality of the first signal S1 can be adjusted. By changing the number of nodes in the output layer of the second network N2 and the number of nodes in the input layer of the third network, dimensionality of the second signal S2 can be adjusted.

The display control unit 16 causes a display device to display at least one of the reproducibility of the first autoencoder 21 and the reproducibility of the second autoencoder 22. As described above, in the first autoencoder 21, after the encoder 21a encodes the input signal for training Sin_t into the first signal for training S1_t, the decoder 21b decodes the first signal for training S1_t into the input signal for training Sin_t. In this case, when a two-dimensional image in which a human face is reflected is used as the input signal for training Sin_t, for example, the display control unit 16 causes the display device to display a two-dimensional image input to the encoder 21a and a two-dimensional image output from the decoder 21b side by side, or causes the display device to display a difference image between these two two-dimensional images to display the reproducibility of the first autoencoder 21. By referring to the reproducibility of the first autoencoder 21 displayed on the display device, the user can check whether the first network N1 is appropriately trained. As an example of displaying the reproducibility of the first autoencoder 21, an example of displaying the image is described herein. Alternatively, the reproducibility of the first autoencoder 21 may be represented and displayed as a numerical value such as the sum or an average value of luminance differences of the images.

As described above, in the second autoencoder 22, after the encoder 22a encodes the output signal for training Sout_t into the second signal for training S2_t, the decoder 22b decodes the second signal for training S2_t into the output signal for training Sout_t. In this case, when the set of three-dimensional point sequences is used as the output signal for training Sout_t, for example, the display control unit 16 causes the display device to display the set of three-dimensional point sequences input to the encoder 22a and the set of three-dimensional point sequences output from the decoder 22b side by side, or causes the display device to display a shift amount of the point sequences to display the reproducibility of the second autoencoder 22. By referring to the reproducibility of the second autoencoder 22 displayed on the display device, the user can check whether the third network N3 is appropriately trained. As an example of displaying the reproducibility of the second autoencoder 22, an example of displaying the image or a shift amount of the point sequences is described herein. Alternatively, the reproducibility of the second autoencoder 22 may be represented and displayed as a numerical value such as the sum or an average value of shift amounts of the point sequences.

As described above, the network training device 10 according to the present embodiment further includes the parameter change unit 15 that changes the structural parameter of the neural network as a training target in accordance with the user operation, and the display control unit 16 that causes the display device to display at least one of the reproducibility of the first autoencoder 21 and the reproducibility of the second autoencoder 22 in addition to the configuration of the network training device 10 according to the first embodiment described above. Accordingly, the network can be stably trained without using a large amount of supervised data similarly to the network training device 10 according to the first embodiment described above, and the neural network can be trained while causing the user to check whether training is performed by using the first autoencoder 21 or the second autoencoder 22, and check validity of the structural parameter of the neural network, so that stability of training can be improved.

Supplementary Explanation

For example, the network training device 10 according to the embodiments described above can be implemented by using a general-purpose computer device (information processing device) as basic hardware. That is, the function of each component of the network training device 10 described above can be implemented by causing a processor mounted on the general-purpose computer device to execute a computer program. In this case, the network training device 10 may be implemented by installing the computer program in the computer device in advance, or implemented by distributing the computer program being stored in a storage medium such as a CD-ROM or distributing the computer program via a network to be appropriately installed in the computer device.

Figure 9:
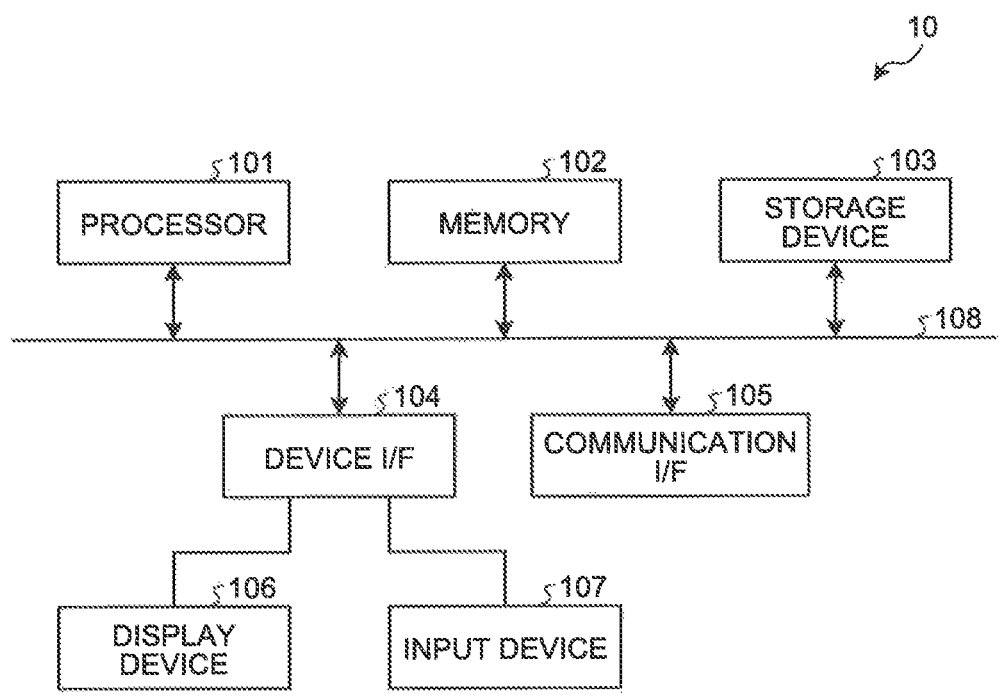
FIG. 9 is a block diagram illustrating a hardware configuration example of the network training device.

FIG. 9 is a block diagram illustrating a hardware configuration example of the network training device 10 according to the present embodiment. As illustrated in FIG. 9, for example, the network training device 10 has a hardware configuration as a general computer including a processor 101 such as a central processing unit (CPU), a memory 102 such as a random access memory (RAM) and a read only memory (ROM), a storage device 103 such as a hard disk drive (HDD) and a solid state drive (SSD), a device I/F 104 for connecting devices including a display device 106 such as a liquid crystal panel and an input device 107 such as a keyboard, a mouse, and a touch panel, a communication I/F 105 for communicating with the outside of the device, and a bus 108 that connects these components with each other.

In a case in which the network training device 10 has a hardware configuration as illustrated in FIG. 9, for example, when the processor 101 uses the memory 102 to read and execute the computer program stored in the storage device 103 and the like, the function of each of the components described above (the first training unit 11, the second training unit 12, the third training unit 13, the fourth training unit 14, the parameter change unit 15, and the display control unit 16) can be implemented.

Part or all of the functions of the components of the network training device 10 described above can be implemented by dedicated hardware (a dedicated processor, not a general-purpose processor) such as an application specific integrated circuit (ASIC) and a field-programmable gate array (FPGA). The functions of the components described above may be implemented by using a plurality of processors.

The network training device 10 according to the embodiments may be configured as a network training system implemented by using a plurality of computer devices (information processing devices) and distributing the functions of the components described above to the computer devices. The network training device 10 according to the embodiments may be a virtual machine operating on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A network training device adapted to train a neural network, the neural network including a first network that converts an input signal to a first signal, a second network that converts the first signal to a second signal, and a third network that converts the second signal to an output signal, the device comprising:
a first training unit configured to train the first network;
a second training unit configured to train the second network; and
a third training unit configured to train the third network, wherein
the first training unit trains the first network as an encoder of a first autoencoder that encodes an input signal for training into a first signal for training having lower dimensionality than the input signal for training and decodes the first signal for training into the input signal for training,
the second training unit trains the second network by backpropagation by using a second signal for training corresponding to the first signal for training as supervised data, and
the second signal for training is generated by an encoder of a second autoencoder that encodes a third signal for training into the second signal for training having lower dimensionality than the third signal for training and decodes the second signal for training into the third signal for training.

2. The device according to claim 1, wherein
the third signal for training is an output signal for training, and
the third training unit trains the third network as a decoder of the second autoencoder.

3. The device according to claim 1, further comprising a fourth training unit configured to fine-tune the entire neural network in which the first network trained by the first training unit, the second network trained by the second training unit, and the third network trained by the third training unit are connected.

4. The device according to claim 1, wherein at least one of the first network and the third network includes a convolutional neural network.

5. The device according to claim 1, further comprising a parameter change unit configured to change, regarding at least one of the first network, the second network, and the third network, at least one of a depth of a layer of a network, number of nodes in the layer, number of channels or a filter size in a case in which the network includes the convolutional neural network, in accordance with a user operation.

6. The device according to claim 1, further comprising a display control unit configured to cause at least one of reproducibility of the first autoencoder and reproducibility of the second autoencoder to be displayed.

7. A network training system adapted to train a neural network by using a plurality of information processing devices, the neural network including a first network that converts an input signal to a first signal, a second network that converts the first signal to a second signal, and a third network that converts the second signal to an output signal, the system comprising:
a first training unit configured to train the first network;
a second training unit configured to train the second network; and a third training unit configured to train the third network, wherein the first training unit trains the first network as an encoder of a first autoencoder that encodes an input signal for training into a first signal for training having lower dimensionality than the input signal for training and decodes the first signal for training into the input signal for training, the second training unit trains the second network by backpropagation by using a second signal for training corresponding to the first signal for training as supervised data, and the second signal for training is generated by an encoder of a second autoencoder that encodes a third signal for training into the second signal for training having lower dimensionality than the third signal for training and decodes the second signal for training into the third signal for training.

8. A network training method adapted to train a neural network, the neural network including a first network that converts an input signal to a first signal, a second network that converts the first signal to a second signal, and a third network that converts the second signal to an output signal, the method comprising:

training the first network;

training the second network; and training the third network, wherein at the training the first network, the first network is trained as an encoder of a first autoencoder that encodes an input signal for training into a first signal for training having lower dimensionality than the input signal for training and decodes the first signal for training into the input signal for training, at the training the second network, the second network is trained by backpropagation by using a second signal for training corresponding to the first signal for training as supervised data, and the second signal for training is generated by an encoder of a second autoencoder that encodes a third signal for training into the second signal for training having lower dimensionality than the third signal for training and decodes the second signal for training into the third signal for training.

9. A computer program product comprising a computer readable medium including programmed instructions, the instructions causing a computer to perform a function of training a neural network, the neural network including a first network that converts an input signal to a first signal, a second network that converts the first signal to a second signal, and a third network that converts the second signal to an output signal, the instructions causing the computer to perform:

training the first network;

training the second network; and training the third network, wherein at the training the first network, the first network is trained as an encoder of a first autoencoder that encodes an input signal for training into a first signal for training having lower dimensionality than the input signal for training and decodes the first signal for training into the input signal for training, at the training the second network, the second network is trained by backpropagation by using a second signal for training corresponding to the first signal for training as supervised data, and the second signal for training is generated by an encoder of a second autoencoder that encodes a third signal for training into the second signal for training having lower dimensionality than the third signal for training and decodes the second signal for training into the third signal for training.

\* \* \* \* \*